US 9,544,165 B2

(12) United States Patent
Gross

(10) Patent No.: US 9,544,165 B2
(45) Date of Patent: Jan. 10, 2017

(54) DATA TRANSMISSION DEVICE FOR REMOTE MONITORING AND REMOTE CONTROLLING IN A DISTRIBUTED PROCESS SYSTEM

(75) Inventor: Peter Gross, Mannheim (DE)

(73) Assignee: ABB Schweiz AG, Baden (CH)

(*) Notice: Subject to any disclaimer, the term of this patent is extended or adjusted under 35 U.S.C. 154(b) by 837 days.

(21) Appl. No.: 13/310,561

(22) Filed: Dec. 2, 2011

(65) Prior Publication Data

US 2012/0131122 A1 May 24, 2012

Related U.S. Application Data

(63) Continuation of application No. PCT/EP2010/003304, filed on Jun. 1, 2010.

(30) Foreign Application Priority Data

Jun. 4, 2009 (DE) .................. 10 2009 023 949

(51) Int. Cl.
*G06F 15/16* (2006.01)
*H04L 12/46* (2006.01)
*H04L 12/66* (2006.01)
*H04L 29/06* (2006.01)
(Continued)

(52) U.S. Cl.
CPC .......... *H04L 12/4625* (2013.01); *H04L 12/66* (2013.01); *H04L 69/08* (2013.01); *H04L 2012/4026* (2013.01)

(58) Field of Classification Search
USPC ....................................... 709/208
See application file for complete search history.

(56) References Cited

U.S. PATENT DOCUMENTS

| 2003/0144803 | A1 | 7/2003 | Wakida et al. |
| 2006/0052958 | A1* | 3/2006 | Hancock et al. ............... 702/60 |
| 2008/0101251 | A1* | 5/2008 | Casebolt et al. ............. 370/252 |

(Continued)

FOREIGN PATENT DOCUMENTS

| EP | 1 976 218 A1 | 10/2008 |
| EP | 1 976 281 A2 | 10/2008 |

(Continued)

OTHER PUBLICATIONS

Anonymous, "IEC 61850-8-1: Communication Networks and Systems in Substations. Part 8-1: Specific Communications Service Mapping (SCSM)—Mappings to MMS", IEC, 2004, the whole document, Switzerland, XP-002607289.

(Continued)

*Primary Examiner* — Chris Parry
*Assistant Examiner* — Alan S Chou
(74) *Attorney, Agent, or Firm* — Barnes & Thornburg LLP

(57) ABSTRACT

A data transmission device remotely monitors and controls a distributed process system, which exchanges data with a superordinate communication unit via an interface and a communication connection in accordance with the IEC 61850 standard, and which is connected to a subordinate process via a further interface and a station bus. The data transmission device includes functional units integrated therein which are implemented as interfaces for connecting the process to at least one superordinate communication unit in accordance with the IEC 61850 standard.

11 Claims, 3 Drawing Sheets

(51) Int. Cl.
G06F 15/173 (2006.01)
H04L 12/40 (2006.01)

(56) References Cited

U.S. PATENT DOCUMENTS

| 2008/0244650 | A1 | 10/2008 | Yamaguchi | |
|---|---|---|---|---|
| 2009/0254655 | A1* | 10/2009 | Kidwell et al. | 709/224 |
| 2011/0320590 | A1* | 12/2011 | Kaneda et al. | 709/224 |
| 2012/0209552 | A1* | 8/2012 | Spanier et al. | 702/64 |

FOREIGN PATENT DOCUMENTS

| WO | WO 2005/055538 A1 | 6/2005 |
|---|---|---|
| WO | WO 2007/060239 A1 | 5/2007 |
| WO | WO 2007/071212 A1 | 6/2007 |
| WO | WO 2008/119750 A1 | 10/2008 |

OTHER PUBLICATIONS

International Search Report (PCT/ISA/210) issued on Nov. 30, 2010, by European Patent Office as the International Searching Authority for International Application No. PCT/EP2010/003304.
German Search Report issued on Jan. 21, 2010 (with English language translation of category of cited documents).
M. Kezunovi et al., "Automated Monitoring and Control Using New Data Integration Paradigm", Proceedings of the 38th Hawaii International on System Science, Jan. 3, 2005, pp. 1-10, XP-010762451.
K-P Brand et al., "The Standard IEC 61850 As Prerequisite for Intelligent Applications in Substations", Power Engineering Society General Meeting, IEEE, Jun. 6, 2004, pp. 714-718, XP-010756486.

* cited by examiner

DATA TRANSMISSION DEVICE FOR REMOTE MONITORING AND REMOTE CONTROLLING IN A DISTRIBUTED PROCESS SYSTEM

RELATED APPLICATION

This application claims priority as a continuation application under 35 U.S.C. §120 to PCT/EP 2010/003304, which was filed as an International Application on Jun. 1, 2010 designating the U.S., and which claims priority to German Application No. 10 2009 023 949.9 filed in Germany on Jun. 4, 2009. The entire contents of these applications are hereby incorporated by reference in their entireties.

FIELD

The present disclosure relates to a data transmission device for remotely monitoring and remotely controlling in a distributed process system, which is configured for monitoring and controlling the process in remote stations. The present disclosure also relates to a distributed system including the data transmission device.

BACKGROUND INFORMATION

Remote control devices for monitoring and controlling local as well as slave processes communicate through a communication connection, for example a network, with a master process control level, which is also referred to as control center, and with slave systems related with the process.

Communication in systems for electric power transmission, such as message transmission between different devices, for example, such as protective devices, switchgear, transformers, etc., is performed through the communication standard IEC 61850, which is described, for example, in EP 1 976 281 A1. For the data exchange in the system, it is necessary to connect the devices which do not operate according to the IEC 61850 standard by means of different modules to the network usually implemented as a data bus. WO 2005/055538 A1, for example, describes the modules necessary for doing so and the operation thereof, such as gateways, for example for converting the incoming data in a format compatible with the IEC 61850 standard, IED (intelligent electronic device) protocol converter, devices for connection to master communication units, such as the network control center, or input/output devices for directly coupling processes.

However, connecting existing devices to the communication network operating according to the ICE 61850 standard by means of the aforementioned modules is associated with a substantial hardware and configuration cost.

SUMMARY

An exemplary embodiment of the present disclosure provides a data transmission device for remotely monitoring and remotely controlling in a distributed process system. The distributed processing system is configured to exchange data with a master communication unit through an interface and a communication connection according to the IEC 61850 standard, and is connected with a slave process through an additional interface and a station bus. The exemplary data transmission device includes functional units integrated in the data transmission device. The functional units are interfaces for connecting the process to at least one master communication unit according to the IEC 61850 standard. The functional units include: at least one IEC61850 server configured for connecting to at least one master communication unit; at least one IEC61850 client configured for connecting a slave station level through a station bus; at least one first unit configured for connecting to at least one of the master communication unit and intelligent electronic devices; and at least one second unit configured for directly coupling processes for connecting control and monitoring signals to an IEC61850 station bus.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
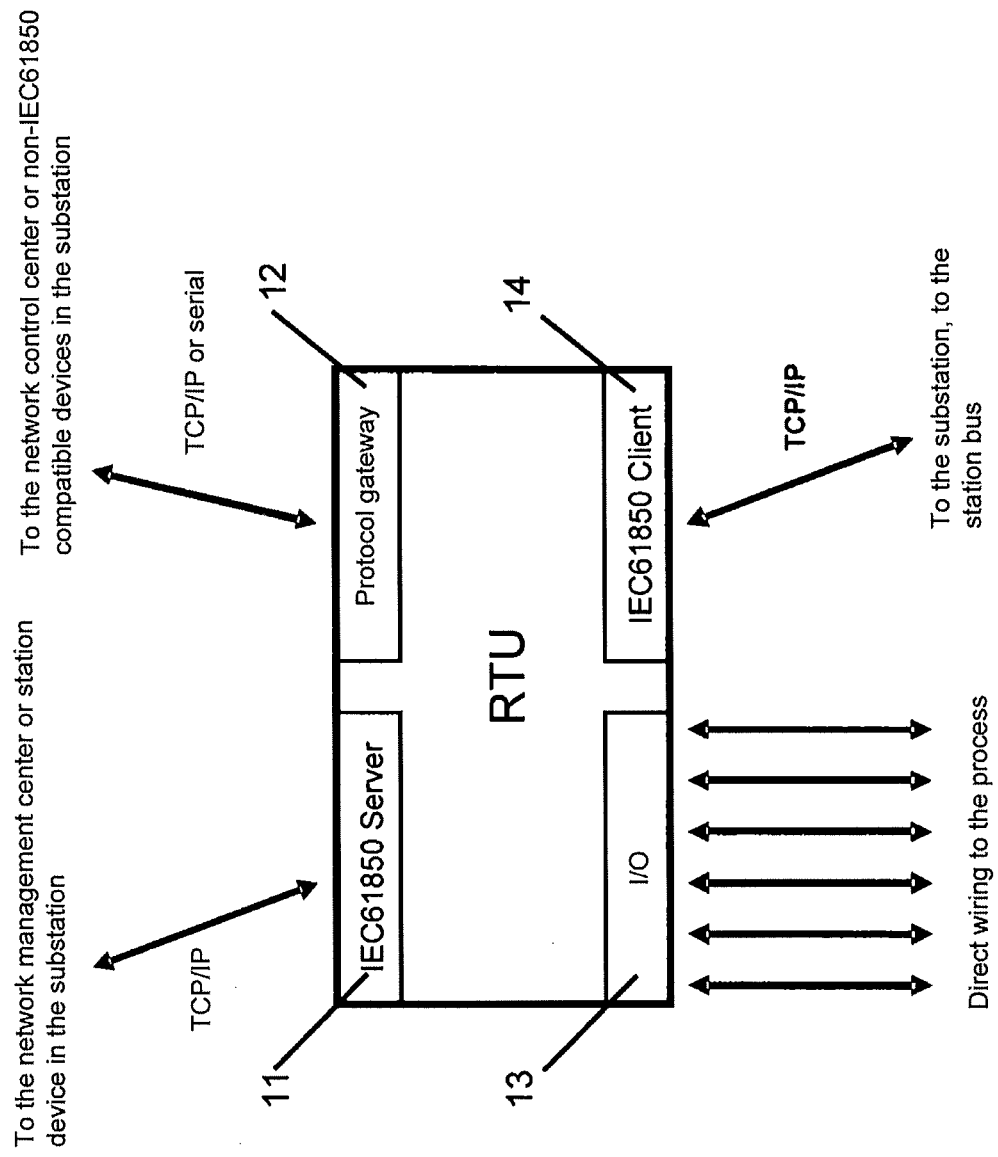
FIG. 1 shows a block diagram of a data transmission device, which is included in a station control system of a power transmission system according to an exemplary embodiment of the present disclosure.

Exemplary embodiments of the present disclosure provide a data transmission device for remotely monitoring and remotely controlling in a distributed process system which prevents the disadvantages associated with known techniques, and which reduces the configuration and hardware cost in the distributed system.

For instance, exemplary embodiments of the present disclosure provide a data transmission device for remotely monitoring and remotely controlling in a distributed process system, which exchanges data with a master communication unit through an interface and a communication connection according to the IEC 61850 standard and which is connected with a slave process through an additional interface and a station bus.

Exemplary embodiments of the present disclosure therefore provide a data transmission device, which is also referred to as Remote Terminal Unit (RTU) or remote control device, for remotely monitoring and remotely controlling in a process in a distributed system, which is particularly suitable for monitoring and controlling the process in remote stations.

In accordance with an exemplary embodiment, the data transmission device of the present disclosure is configured for exchanging data through at least one interface and a communication connection, which is implemented for example as a network or data bus, with a master communication unit according to the IEC 61850 standard and through at least one additional interface and a station bus is connected with a slave process.

The following functional units, which are configured as interfaces for connecting the process to the master communication unit according to the IEC 61850 standard, are integrated in the data transmission device: (i) at least one IEC61850 server for connecting to master communication units; (ii) at least one IEC61850 client, for example, for connecting a substation through a station bus, where the IEC61850 client communicates through a station bus by means of protocols based on a network standard, such as the TCP/IP protocol (Transmission Control Protocol/Internet Protocol), for example, with a slave station level; (iii) at least one unit for connecting the master communication unit, such as a master process control level, for example, a network control center or gateways and for connecting intelligent electronic devices (IEDs), such as protective and control devices for example, by means of additional network protocols, for example TCP/IP and serial protocols, also referred to as protocol gateways; and (iv) at least one additional unit for directly coupling processes for connecting control and monitoring signals to an IEC61850 station bus.

Since the functional units for connecting the process to the master communication units according to the IEC 61850 standard are established in a single device, economical integration and connection of the slave process in station control systems can be advantageously achieved. For example, the external connection between the IEC61850 client, the IEC61850 server, the protocol gateways and the additional units for directly coupling processes through the station bus are eliminated because now all these functions are integrated in a single device.

The hybrid application thus established in the Remote Terminal Unit (RTU) enables its use within a station bus of the station control system, operating based on the IEC61850, for the following purposes, for example:
  (a) connecting existing serial or non-IEC61850 compatible IED, such as protective and control devices to the IEC 61850 station bus;
  (b) establishing a connection between two IEC61850 station buses in the network in the distributed system; and
  (c) establishing direct process connection for connecting control and monitoring devices to the IEC61850 station bus.

Integrating an additional unit in the RTU is further provided as an advantageous configuration. The functionality of the additional unit is provided for performing control tasks by means of integrated SPS functionality and, for example, performing logical and project-specific adaptations in the system.

In accordance with an exemplary embodiment, the data transmission device can be configured for use in remote control substations, in remote control nodes, in station control technology and in communication networks, which can operate based on the IEC60870 standard and/or DNP3. In addition, according to an exemplary embodiment, the data transmission device can advantageously perform the data exchange between the slave process and the master communication units through a web connection.

FIG. 1 shows a data transmission device RTU according to an exemplary embodiment of the present disclosure. The data transmission device RTU can be integrated in a system for monitoring and controlling a process in remote stations. Functional units, also referred to as interfaces, are provided to that end in the data transmission device RTU for processing as well as for communication according to the IEC 61850 standard through a network with at least one master communication unit.

The data transmission device RTU includes a first functional unit 11 implemented as an IEC61850 server for communication according to the IEC 61850 standard through a communication connection with a central station device, for example a station gateway or a master process control level or control center. The data transmission device RTU also includes a second functional unit 13 for directly wiring with the slave process. The communication between the data transmission device RTU and the master process control level can be established through the IEC61850 server 11 by means of a network protocol, for example, through a TCP/IP protocol. The second functional unit 13 includes binary and/or analog inputs and/or outputs for directly coupling processes, to which control and monitoring signals are supplied from the process and which are prepared for coupling to the station buses which operate based on the IEC61850 standard.

An additional functional unit 14 is connected with a substation through a station bus and communicates through ICE61850 protocols based on a network standard (e.g., TCP/IP) with the substation connected thereto.

The data transmission device also includes a functional unit 12 which is implemented as a protocol gateway for connecting the master communication unit, such as for example process control levels, network control centers or gateways, by means of serial protocols and/or a network protocol (e.g., based on TCP/IP), and for connecting intelligent electronic devices (IEDs), such as protective and control devices for example, by means of additional network (e.g., TCP/IP) and serial protocols, also referred to as protocol gateways.

Figure 2:
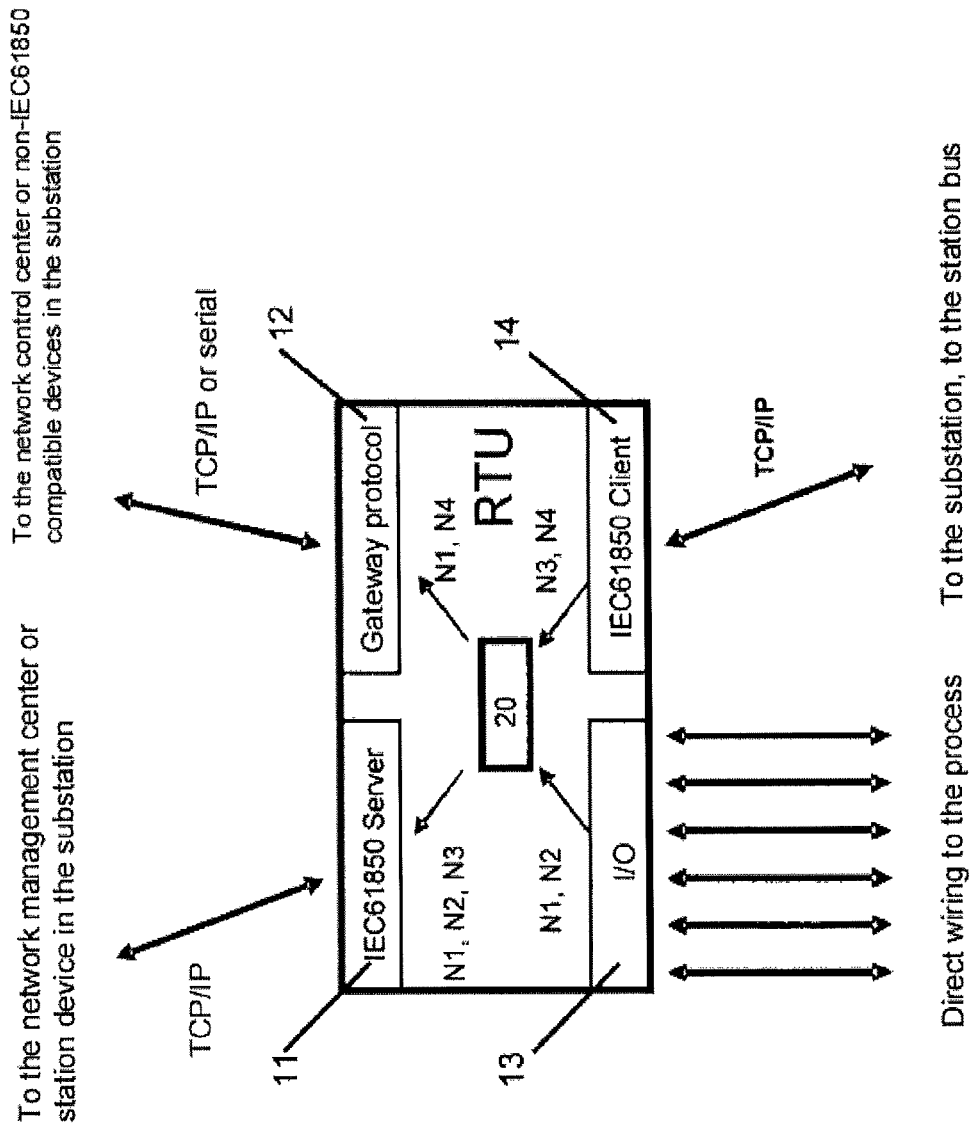
FIG. 2 shows a block diagram of a data transmission device depicting the internal transmission of message telegrams between the functional units according to an exemplary embodiment of the present disclosure.

FIG. 2 shows a block diagram of an exemplary embodiment of the data transmission device RTU which depicts the internal transmission of message telegrams N1, N2, N3, N4 between the functional units 11, 12, 13, 14. To that end, the data transmission device RTU includes a configurable filter function 20 which coordinates the data exchange between the functional units 11, 12, 13, 14 in the data transmission device RTU.

Figure 3:
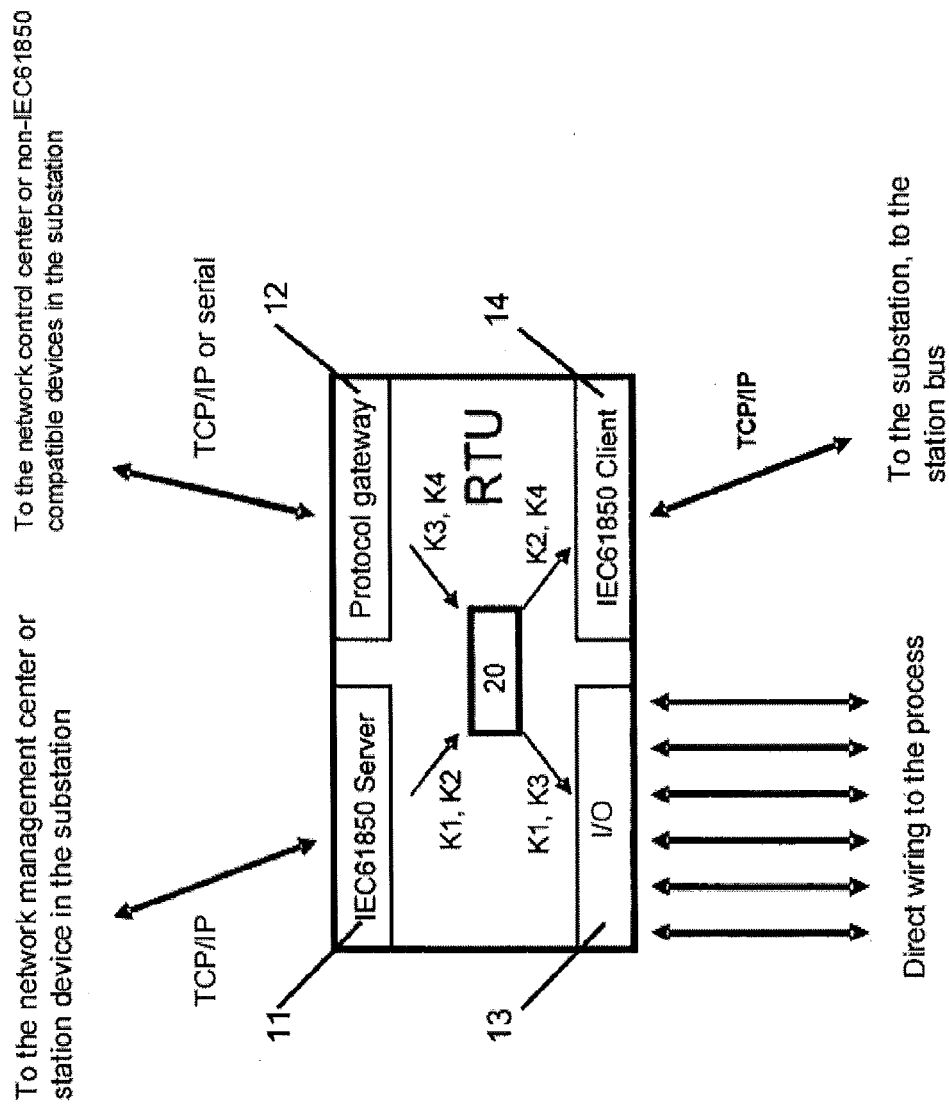
FIG. 3 shows an additional block diagram of the data transmission device which illustrates the internal transmission of command telegrams between the functional units according to an exemplary embodiment of the present disclosure.

The filter function 20 is provided for filtering in a controlled manner message telegrams N1, N2, N3, N4 for notifications, shown in FIG. 2 by way of example, and command telegrams K1, K2, K3, K4 for control commands, shown in FIG. 3 by way of example. To that end, filter rules determining the communication channel of the telegrams N1, N2, N3, N4, K2, K3, K4 in the data transmission device RTU, for example, to which functional unit 11, 12, 13, 14 the respective telegrams is/are to be transmitted, are deposited in the configuration of the filter function 20. For example, the filter rules can be recorded in a non-transitory computer-readable recording medium (e.g., a non-volatile memory) comprised in the data transmission device RTU. The filter function 20 can therefore communicate with such a memory to function according to the recorded filter rules.

The telegrams N1, N2, N3, N4, K2, K3, K4 are transmitted, according to their signaling direction according to the filter rules previously configured in the data transmission device RTU, to the functional units 11, 12, 13, 14, which operate as a receiver in each case, through the transmission channels determined in the filter rules. As illustrated in FIG. 2, for example, message telegram N1 is transmitted from functional unit 13 for a direct process activation according to the filter rules deposited in the filter function 20 to both the IEC61850 server 11 and to the protocol gateway 12. In contrast, message telegram N2 is sent from functional unit 13 to only the IEC61850 server 11. The filter rules are also similarly applied for the IEC61850 client 14 in the RTU.

FIG. 3 shows an additional block diagram of an exemplary embodiment of the data transmission device RTU which illustrates the internal transmission of command telegrams K1, K2, K3, K4 between the functional units 11, 12, 13, 14.

For the commands transmitted by means of the command telegrams K1, K2, K3, K4, the receiver functional unit 11, 12, 13, 14 is also determined with filter rules previously determined in the filter function 20. For example, command telegram K1 is supplied from the IEC61850 server 11 through the filter function 20 and the functional unit 13 to the direct process activation. In contrast, command telegram K2 is supplied through the filter function to the IEC61850 client 14.

The possibility depicted for filtering the message and/or command telegrams N1, N2, N3, N4, K1, K2, K3, K4 can be extended by means of an SPS function. To that end, an additional unit is integrated in the data transmission device RTU for performing control tasks by means of an integrated SPS functionality.

Gateways, connections to additional substations, which are also referred to as proxy solutions, classic front-end processor applications with direct process coupling in a device, can be advantageously carried out with the data transmission device RTU according to the disclosure, which can also be configured to function as a data acquisition device. Accordingly, a reduction of the number of modules as well as a reduced configuration cost for the activation of process signals in the distributed system are achieved.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A remote terminal unit for integration and connection of a slave process in a station control system, wherein the remote terminal unit is configured to exchange data with at least one master communication unit, and is connected with the slave process,
wherein the remote terminal unit comprises functional units integrated in the remote terminal unit, the functional units being interfaces for connecting the slave process to the at least one master communication unit according to the IEC 61850 standard,
wherein the functional units include:
at least one IEC61850 server configured for connecting to at least one master communication unit;
at least one IEC61850 client configured for connecting a slave station level through a IEC61850 station bus;
at least one first unit implemented as a protocol gateway and configured for connecting to the at least one master communication unit and for connecting intelligent electronic devices by means of additional network protocols; and
at least one second unit configured for directly wiring with the slave process for connecting control and monitoring signals to the IEC61850 station bus, and
wherein the remote terminal unit comprises a configurable filter function coordinating the data exchange between the functional units.

2. The remote terminal unit according to claim 1, comprising:
at least one third unit configured for performing control tasks by means of an integrated PLC functionality.

3. The remote terminal unit according to claim 1, wherein the at least one first unit for connecting the at least one of the master communication unit and the intelligent electronic devices is configured to operate based on at least one of serial protocols and TCP/IP.

4. The remote terminal unit according to claim 1, wherein the at least one first unit is configured for connecting a non-IEC 61850 compatible electronic device to the IEC61850 station bus.

5. The remote terminal unit according to claim 4, wherein the non-IEC 61850 compatible electronic device includes at least one of an IEC 61850 station bus protective device and an IEC 61850 control device.

6. The remote terminal unit according to claim 1, wherein two IEC 61850 network station buses communicate with one another through the remote terminal unit and the functional units.

7. The remote terminal unit according to claim 1, wherein the functional units are configured to connect control and monitoring devices directly to the IEC61850 station bus.

8. The remote terminal unit according to claim 1, wherein filter rules determining the communication channel between the functional units are deposited in the configuration of the filter function.

9. The remote terminal unit according to claim 1, wherein the remote terminal unit is configured to perform data exchange with the master communication unit through a web connection.

10. The remote terminal unit according to claim 9, wherein the remote terminal unit is configured to perform the data exchange with the master communication unit by means of a TCP/IP protocol.

11. A distributed system comprising the remote terminal unit according to claim 1,
wherein the distributed system comprises at least one of a system with remote control substations, a system for station control technology, and a system of remote control nodes and communication networks, which operate based on the IEC60870 standard, and
wherein the remote terminal unit is configured to exchange data with the distributed system.

* * * * *